(12) United States Patent
Zandbergen et al.

(10) Patent No.: US 8,684,380 B2
(45) Date of Patent: Apr. 1, 2014

(54) WHEEL SUSPENSION FOR AUTOMOTIVE VEHICLE

(75) Inventors: Paul Zandbergen, Montzen (BE); Andreas Carlitz, Stolberg (DE); Theo Kueppers, Waldfeucht (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/485,208

(22) Filed: May 31, 2012

(65) Prior Publication Data

US 2012/0306176 A1    Dec. 6, 2012

(30) Foreign Application Priority Data

Jun. 1, 2011   (DE) .......................... 10 2011 050 807

(51) Int. Cl.
*B60G 21/05*      (2006.01)
*B60G 9/02*       (2006.01)

(52) U.S. Cl.
CPC .............. *B60G 9/025* (2013.01); *B60G 21/051* (2013.01); *B60G 2200/342* (2013.01); *B60G 2200/21* (2013.01); *B60G 2202/1362* (2013.01); *B60G 2204/421* (2013.01)
USPC ............................ 280/124.106; 280/124.128

(58) Field of Classification Search
CPC .. B60G 9/025; B60G 21/051; B60G 21/0551; B60G 2200/21; B60G 2200/34; B60G 2200/342; B60G 2202/1362; B60G 2204/42
USPC .................... 280/124.106, 124.107, 124.116, 280/124.128
See application file for complete search history.

(56) References Cited

U.S. PATENT DOCUMENTS

| 5,839,741 A * | 11/1998 | Heyring ................. 280/124.106 |
| 6,142,494 A * | 11/2000 | Higuchi ..................... 280/93.51 |
| 6,499,754 B1 * | 12/2002 | Heyring et al. ........ 280/124.106 |
| 8,177,245 B2 * | 5/2012 | Bitz et al. ............... 280/124.128 |
| 2010/0052281 A1 | 3/2010 | Bitz et al. |
| 2011/0031712 A1 * | 2/2011 | Bitz et al. ............... 280/124.106 |
| 2011/0127744 A1 * | 6/2011 | Siebeneick et al. .... 280/124.128 |

* cited by examiner

*Primary Examiner* — Joseph M Rocca
*Assistant Examiner* — Timothy Wilhelm
(74) *Attorney, Agent, or Firm* — L.C. Begin & Associates, PLLC

(57) ABSTRACT

The invention concerns a wheel suspension system for the non-steered wheels (16) of a motor vehicle, with a twist beam axle (2) which comprises two wheel-supporting trailing arms (3, 13) pivotably mounted on a motor vehicle body (15) and a cross member (6) connecting the trailing arms (3, 13) together, and a Watt linkage (8) also connecting the trailing arms (3, 13) together, at least one articulated holder (10) being integrated in each trailing arm (3, 13) itself for articulated coupling of the Watt linkage (8).

16 Claims, 4 Drawing Sheets

WHEEL SUSPENSION FOR AUTOMOTIVE VEHICLE

The present invention concerns a wheel suspension system for the non-steered wheels of a motor vehicle, with a twist beam axle and a Watt linkage, according to the preamble of claim 1.

Such wheel suspension systems with twist beam axles are known in themselves, as is the use of Watt linkages in widely varying technical fields including wheel suspension systems. Usually Watt linkages are provided on rigid axles in order to achieve firstly a more precise lateral guidance of the rigid axle under the effect of the lateral forces acting on the rigid axle and secondly to allow a desired compliance steering behavior of the rigid axle, for example a realignment toward toe-in.

Such a wheel suspension system is known, for example, from DE 27 42 426 A1. In this wheel suspension system the cross member is formed as a rigid axle and connects the outer pivot points of the wheels together. The trailing arms are arranged with one end directly on the cross member. Between the rigid axle and the motor vehicle body are arranged shock absorbers which rest on the Watt linkage. This wheel suspension system however only has very low driving comfort.

Furthermore DE 10 2006 033 755 A1 discloses a wheel suspension system with a twist beam axle which comprises two wheel-supporting trailing arms and a cross member connecting the trailing arms together, and a Watt linkage also connecting the trailing arms together. The trailing arms have radial arms directed toward each other, on which bearing parts of the Watt linkage are attached. The disadvantage here is the relatively costly and complex construction of the connection of the Watt linkage to the trailing arms via the radial arms, which increases the total weight of the twist beam axle, inter alia, due to the multiplicity of components required. Furthermore the pivot points of the connection between the radial arm and the Watt linkage are located relatively far inboard, i.e. away from the wheel center plane toward the vehicle center, which can have unfavorable effects on the kinematic properties of the wheel suspension system.

In this context the present invention is based on the object of producing a wheel suspension system of the type cited initially which has a particularly simple construction, requires only few components and is thus reduced both in complexity and in relation to the weight of the wheel suspension system. In addition the pivot point between the Watt linkage and the twist beam axle should be arranged as close as possible to the wheel center plane in order to have a positive effect on the kinematics of the wheel suspension system and hence provide a particularly high driving comfort.

This object is achieved by a wheel suspension system with the features of claim 1. Further particularly advantageous embodiments of the invention are disclosed in the sub-claims.

It is to be pointed out that the features listed individually in the claims can be combined in any arbitrary, technically sensible manner and show further embodiments of the invention. The description characterizes and specifies the invention in particular also in connection with the drawing.

According to the invention a wheel suspension system for the non-steered wheels of a motor vehicle has a twist beam axle which comprises two wheel-supporting trailing arms pivotably mounted on a motor vehicle body and a cross member connecting the trailing arms together, and a Watt linkage also connecting the trailing arms together. At least one articulated holder is integrated in each trailing arm itself for articulated coupling of the Watt linkage. This design allows a particularly simple construction with as few components as possible, which as a whole reduces the complexity of the wheel suspension system and its weight. In addition the pivot point between the Watt linkage and the twist beam axle or the respective trailing arm is thus arranged as close as possible to the wheel center plane, which has a positive influence on the kinematic properties of the wheel suspension system and offers a particularly high driving comfort.

In an advantageous embodiment of the invention, the articulated holder is formed by a ball joint or by a pivot bush. Pivot bushes are, for example, conventional rubber-metal bushes. These constitute a particularly simple and economic way of creating not only the articulated but also a resilient connection of the Watt linkage with the trailing arms. A ball joint offers the essential advantage of a larger number of degrees of freedom for the articulated connection between the Watt linkage and the respective trailing arms.

A further advantageous embodiment of the invention provides that the Watt linkage comprises two rods and a rocker rotatably mounted on the motor vehicle body, the rods being coupled by their trailing arm side ends in each case at the corresponding holders of the trailing arms and being connected together via the rocker with their ends remote from the trailing arms. This allows a particularly simple and economic production of the wheel suspension system according to the invention.

According to a further advantageous embodiment of the invention, the rotary axis of the rocker runs parallel to the vehicle longitudinal axis. Accordingly the Watt linkage, i.e. both the rods and the rocker of the Watt linkage, can be arranged substantially in a plane perpendicular to the travel direction of the motor vehicle, whereby the Watt linkage is particularly compact in the direction of travel of the motor vehicle.

A further advantageous embodiment of the invention provides that the rotary axis of the rocker runs parallel to the vehicle vertical axis. Accordingly the Watt linkage comprising the rods and the rocker can be arranged substantially in a plane parallel to the road surface plane, requiring only a particularly small vertical installation space for the Watt linkage. Consequently the installation of the Watt linkage in the wheel suspension system according to the invention is not substantially restricted by the vertical installation space available in the motor vehicle.

Further advantageous details and effects of the invention are described below in more detail with reference to various embodiment examples shown in the figures. These show:

FIG. 1 a perspective part view of a first embodiment example of a wheel suspension system according to the invention;

FIG. 2 a schematic rear view and schematic top view of a second embodiment example of a wheel suspension system according to the invention;

FIG. 3 a schematic rear view and schematic top view of a third embodiment example of a wheel suspension system according to the invention;

FIG. 4 a schematic perspective view of the wheel suspension system shown in FIG. 2, and FIG. 5 a schematic perspective view of the wheel suspension system shown in FIG. 3.

In the different figures, the same parts are always given the same reference numerals so that these are usually only described once.

FIG. 1 shows a perspective part view of a first embodiment example of a wheel suspension system 1 according to the invention for the non-steered wheels of a motor vehicle. The wheel suspension system 1 comprises a twist beam axle 2. In relation to the direction of travel of the motor vehicle, FIG. 1 shows only the left part of the twist beam axle 2. As the twist beam axle 2 is designed to be substantially symmetrical in relation to the vehicle longitudinal center plane, the left-hand side components described below of wheel suspension system 1 are also provided correspondingly on the right-hand side of the wheel suspension system 1. Where the description below does not expressly indicate that a particular component of the wheel suspension system 1 is assigned only to a single side of the vehicle, in the sense of this description it is assumed that this component—even if not explicitly stated—is provided on the respective other vehicle side of the wheel suspension system 1 according to the invention.

As evident from FIG. 1, the twist beam axle 2 on the left side comprises a wheel-supporting trailing arm 3. The trailing arm 3 is pivotably coupled to the motor vehicle body (not shown in the figure) via a body-side pivot bearing 4, in particular a rubber-metal bearing. A wheel of the motor vehicle (not shown in FIG. 1) is connected to the twist beam axle 2 or trailing arm 3 in a manner known per se via the wheel mounting 5 connected with the trailing arm 3. As is further shown in FIG. 1, the wheel mounting 5 is arranged in an end portion of the trailing arm 3 remote from the pivot bearing 4.

Between the pivot bearing 4 and the wheel mounting 5 i.e. in a front section viewed in the direction of travel, the trailing arm 3 is connected with a right-side trailing arm—not shown in FIG. 1—via a cross member 6, in particular a deflection-resistant but torsionally flexible cross member 6.

FIG. 1 also shows that a bracing element 7 extends between the portion of the cross member 6 connected with the trailing arm 3 and the portion of the trailing arm 3 on the wheel mounting side. This element is connected with its short side both to the trailing arm 3 and to the end portion of the cross member 6, preferably by material connection such as for example welding. The bracing element 7 is furthermore advantageously formed such that it can receive and support a damping element not shown in the figure, for example a shock absorber, and/or a spring element also not shown, for example a coil spring. The bracing element 7 is also arranged between the trailing arm 3 and the cross member 6 such that it firstly braces the trailing arm 3 against lateral forces which act on the wheel connected via the wheel mounting 5, and secondly can hold the trailing arm 3 angularly fixed in relation to the cross member 6. As already explained above, a bracing element on the right side, not shown in FIG. 1, is also provided correspondingly on the right-hand side of the twist beam axle 2 between the right-side trailing arm and the cross member 6.

FIG. 1 finally also shows part of a Watt linkage 8 or an end portion of a rod 9 of the Watt linkage 8 on the trailing arm side. The rod 9 at the end is pivotably connected with the trailing arm 3. For this the trailing arm 3 has an articulated holder 10 arranged behind the wheel mounting 5 in the direction of travel, which holder 10 forms a pivot point for the connection between the trailing arm 3 and the Watt linkage 8 or rod 9. The holder 10 which can for example be formed by a ball joint or pivot bush is integrated in the trailing arm 3 itself. This simplifies the construction of the wheel suspension 1 by reducing the number of components required, which reduces both the complexity of the wheel suspension 1 and its weight. In addition the coupling of the Watt linkage 8 according to the invention directly on the trailing arm 3 allows the pivot point between the Watt linkage 8 or rod 9 and the trailing arm 3 to be arranged as close as possible to the wheel center plane, which has a favorable effect on the kinematics of the wheel suspension system 1 and ensures a particularly high driving comfort.

The coupling described above of the Watt linkage 8 on the trailing arm 3 is also provided correspondingly on the right-hand vehicle side, not shown in FIG. 1, of the twist beam axle 2 or the right-hand trailing arm via an articulated right-hand holder correspondingly integrated therein. Thus in addition to the cross member 6, the Watt linkage 8 connects together the left trailing arm 3 and right trailing arm of the twist beam axle 2.

FIG. 2 shows two different views of a second embodiment example of a wheel suspension system 11 according to the invention, wherein FIG. 2A shows a schematic rear view and FIG. 2B a schematic top view of the wheel suspension system 11. FIG. 2B also indicates with arrow 12 the direction of travel of the motor vehicle containing the wheel suspension system 11.

The wheel suspension system 11 is shown in FIG. 2 over the entire width of the vehicle so that as well as the left trailing arm 3, the right trailing arm 13 of the twist beam axle 2 is visible. As already explained in connection with the description of FIG. 1, the right trailing arm 13 is also pivotably mounted on a motor vehicle body 15 via a pivot bearing 14 on the body side, for example a rubber-metal bearing. Via in each case one wheel mounting not shown in FIG. 2, the wheels 16 of the motor vehicle are held by the left trailing arm 3 or right trailing arm 13 respectively. The wheels 16 are connected in a manner known per se to the trailing arms 3 and 13 in each case in an end portion of the trailing arms 3 and 13 remote from the pivot bearings 4 and 14 on the twist beam axle 2.

As further shown in FIG. 2, the cross member 6 connects together the two trailing arms 3 and 13. In addition the trailing arms 3 and 13 of the twist beam axle 2 are also connected together via the Watt linkage 8. In particular the Watt linkage 8 in the embodiment example shown comprises two rods 9 and a rocker 17 rotatably mounted on the motor vehicle body 15. Via the rocker 17 the rods 9 of the Watt linkage 8 or their ends remote from the respective trailing arms 3 and 13 are connected together in a manner known per se. The ends of the rods 9 on the trailing arm side, as already described in the explanation for FIG. 1, are each connected with the corresponding trailing arms 3 and 13 via the articulated holders 10 integrated therein in each case. As shown in particular in FIG. 2B, the holders 10 viewed in the direction of travel 12 are arranged slightly behind the wheel axles 18 of the wheels 16.

The rocker 17 of the Watt linkage 8 is mounted rotatable about the rotary axis 19 on the vehicle body 15. As shown in FIG. 2B, the rotary axis 19 of the embodiment example shown runs parallel to the vehicle longitudinal axis or parallel to the direction of travel 12. Thus in this embodiment example the Watt linkage 8, in particular the rods 9 and rocker 17, can be arranged substantially in a plane perpendicular to the direction of travel 12 of the motor vehicle, whereby the Watt linkage 8 is particularly compact in the direction of travel 12.

As shown in FIG. 2A, in this case the articulated holder 10 of the left trailing arm 3 is arranged slightly lower, i.e. closer to a road surface plane 20, on the trailing arm 3 than the corresponding holder 10 on the right trailing arm 13. This can be achieved for example by a corresponding curve in the trailing arm 3 in the direction of the road surface plane 20, wherein the articulated holder 10 is integrated in said curve, at least in the region of the connecting point. Also on the trailing arm 3 in the region of the connecting point, a flange which is connected with or formed of one piece with the trailing arm 3 and in which the articulated holder 10 is integrated, can extend in the direction of the road surface plane 20. Evidently the trailing arm 3 and/or the trailing arm 13 can also be adequately dimensioned in the direction of the vehicle vertical axis so as to allow the coupling of the Watt linkage 8 or the rods 9 in the described manner.

FIG. 3 depicts two different views of a third embodiment example of a wheel suspension system 21 according to the invention, wherein

Figure 1:
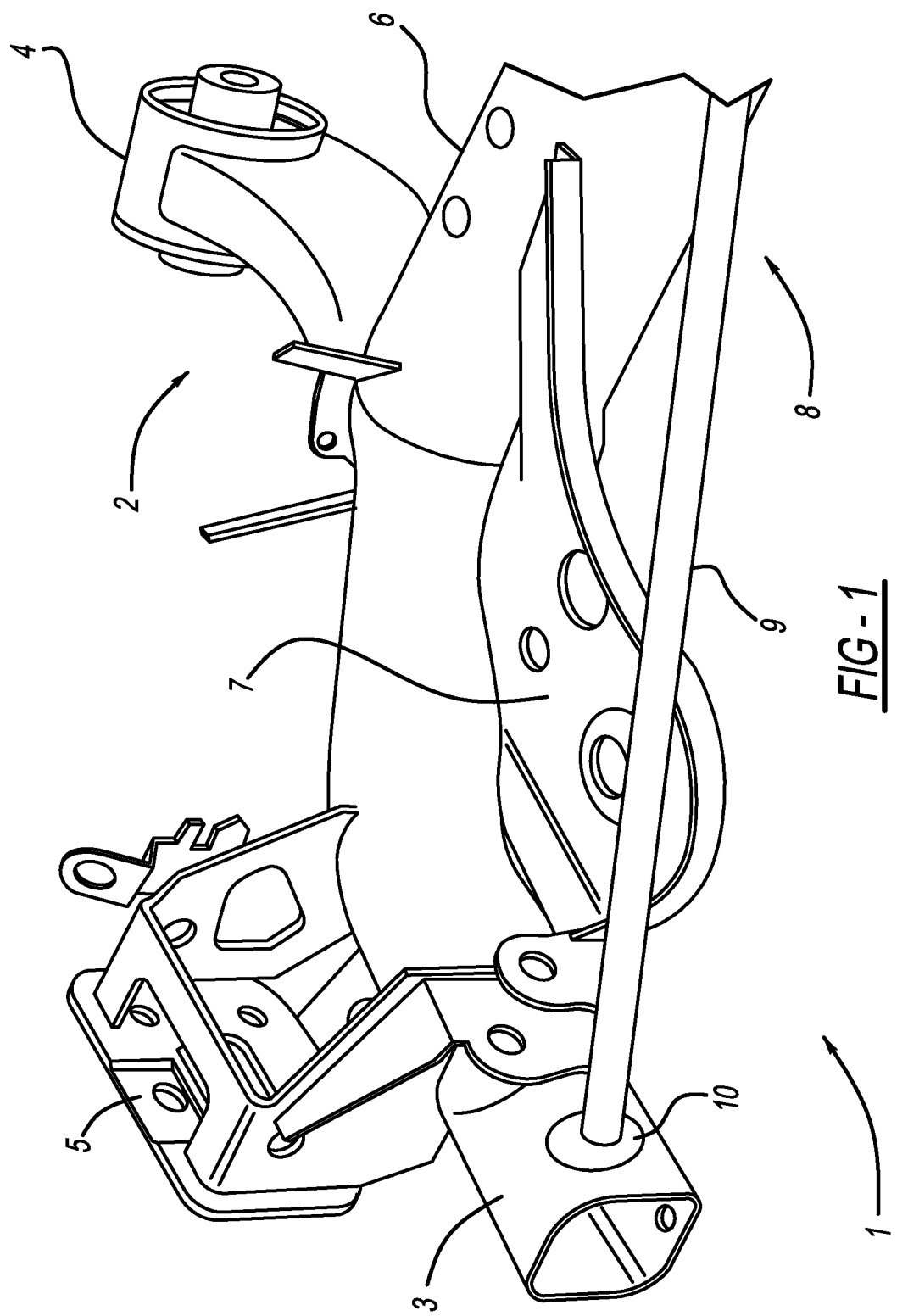
Figure 2A:
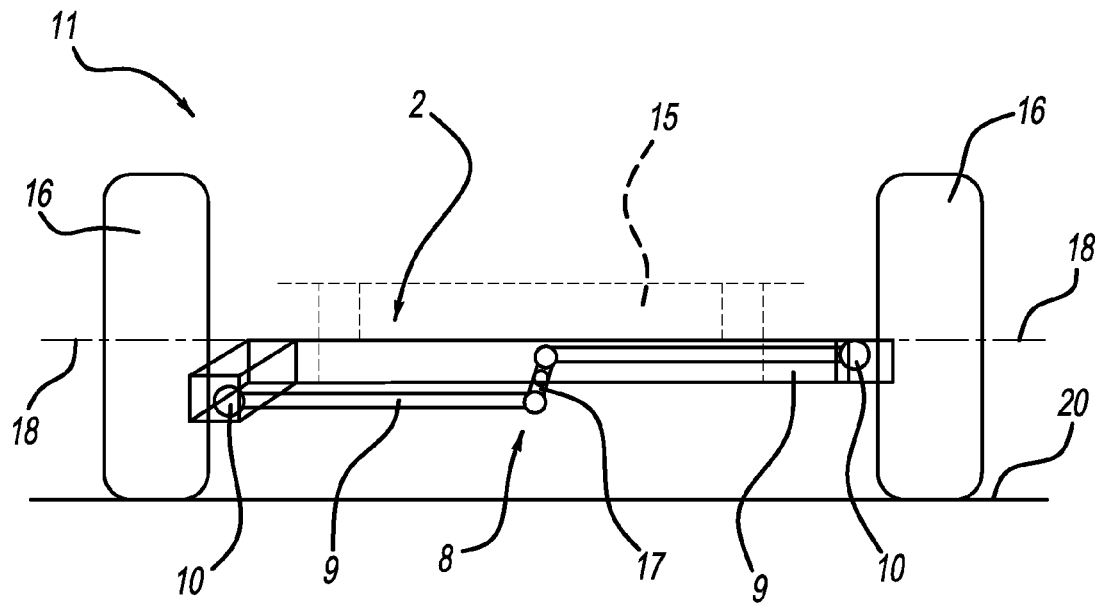
Figure 2B:
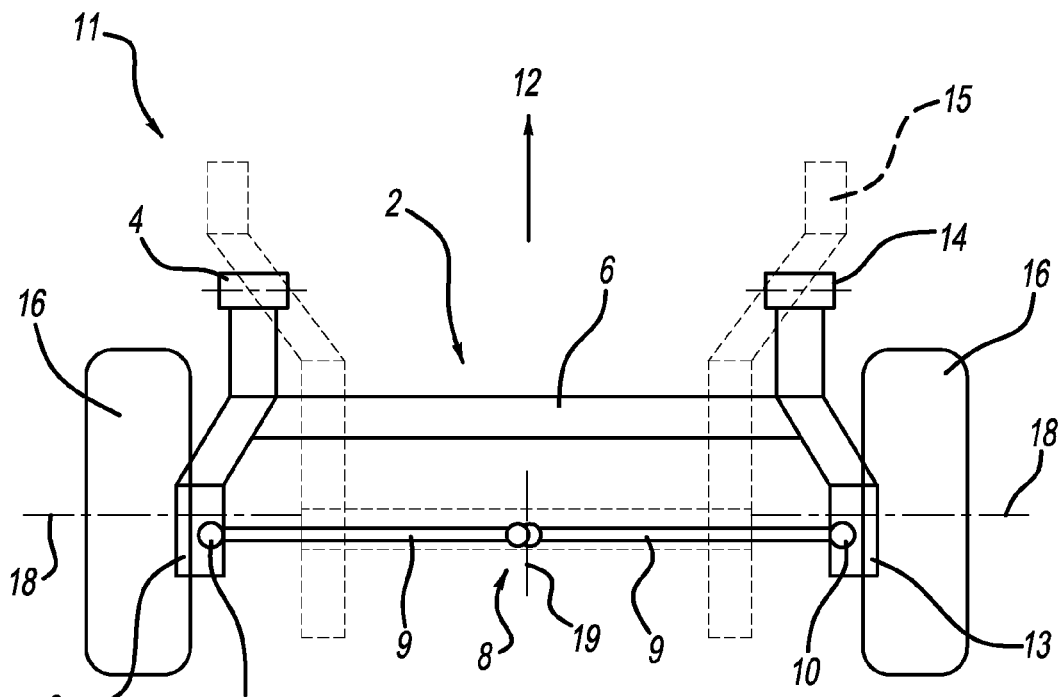
Figure 3A:
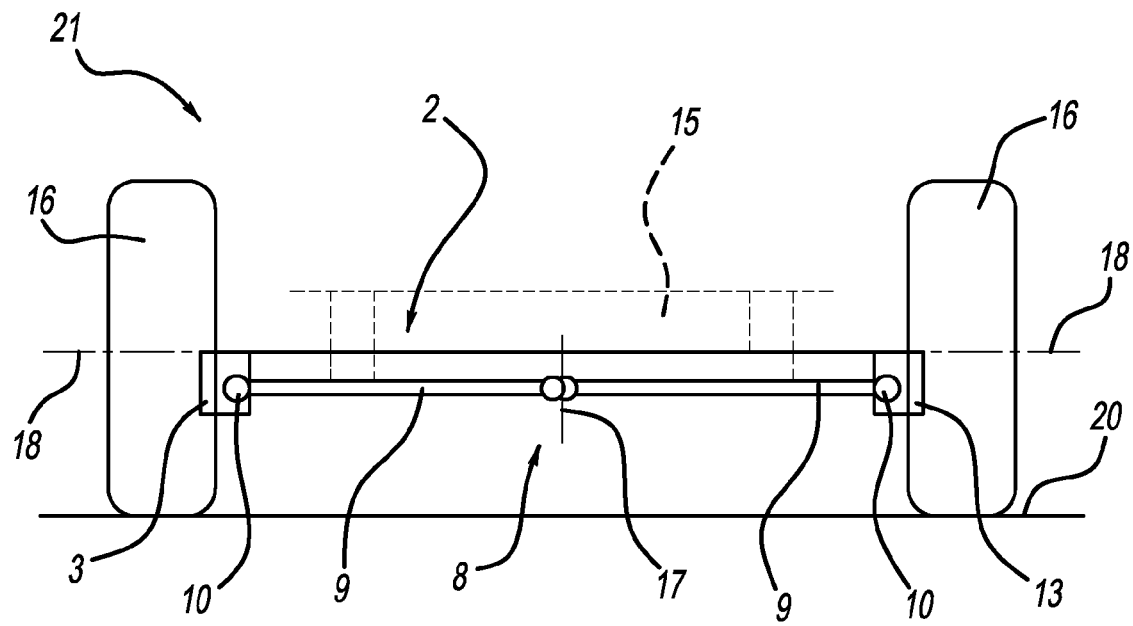
FIG. 3A shows a schematic rear view and FIG. 3B a schematic top view of the wheel suspension system 21.

The wheel suspension system 21 shown in FIG. 3 differs from the wheel suspension system 11 shown in FIG. 2 essentially in a different arrangement of the Watt linkage 8. In the third embodiment example shown in FIG. 3, the rotary axis 19 of the rocker 17 of the Watt linkage 8 runs parallel to the vehicle vertical axis, as clearly evident in FIG. 3A. Accordingly the Watt linkage 8 comprising the rods 9 and rocker 17 can be arranged substantially in a plane parallel to the road surface plane 20, requiring only a small vertical construction space for the Watt linkage 8. Consequently the installation of the Watt linkage 8 in the wheel suspension system 21 according to the invention is not substantially restricted by the construction space available in the motor vehicle and for example could be advantageously used in the case of low ground clearance of the motor vehicle.

Figure 3B:
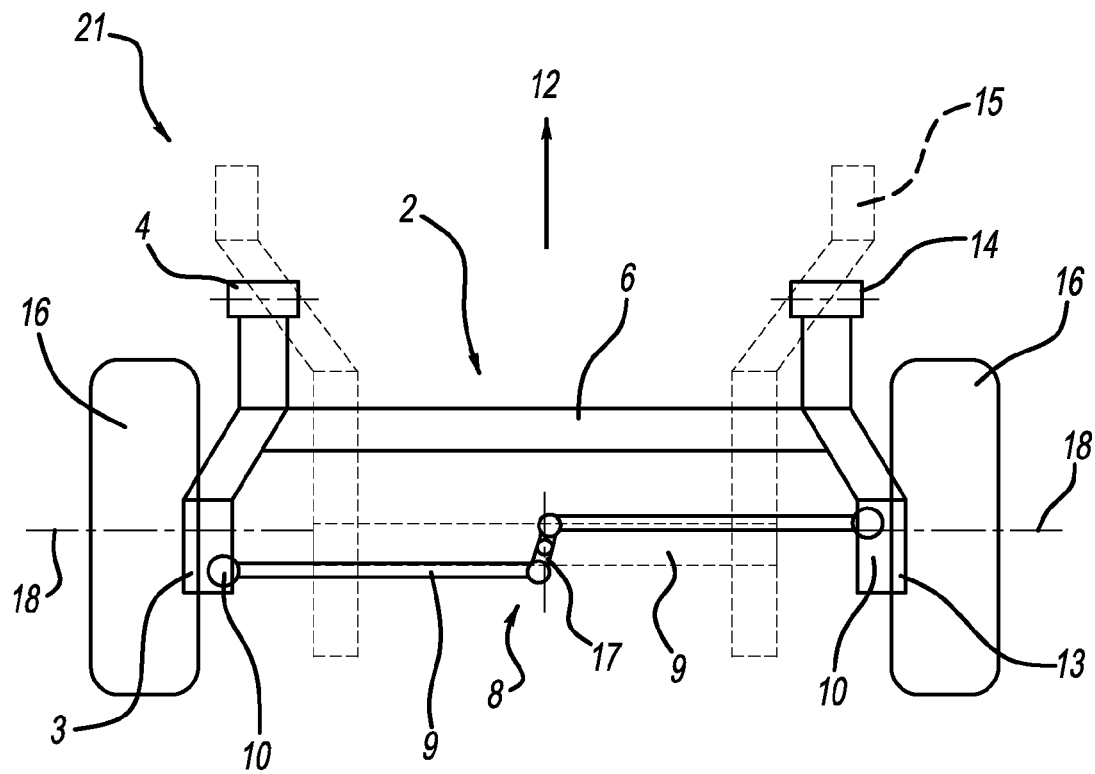
Figure 4:
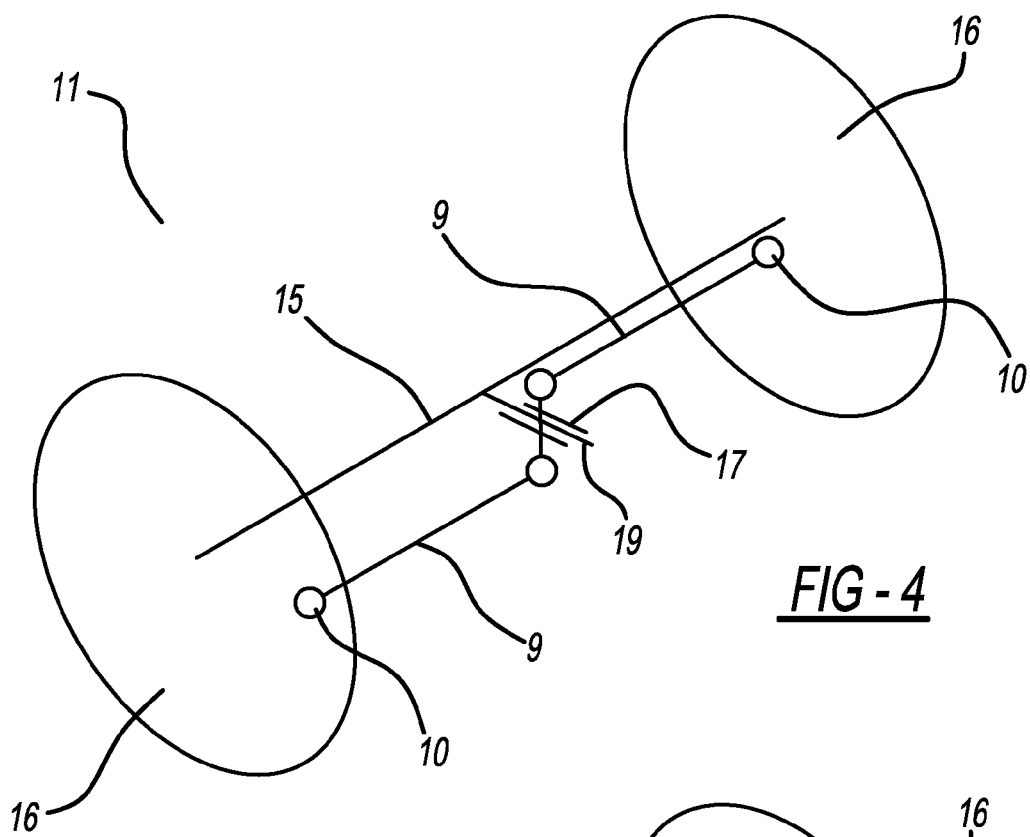
FIG. 4 depicts the second embodiment example, shown in FIG. 2 and described in detail in this context, of the wheel suspension system 11 according to the invention in a schematic perspective view restricted to the essential components.

As shown in FIG. 3B, in the third embodiment example shown the articulated holder 10 of the left trailing arm 3 is arranged slightly further back on the trailing arm 3, in relation to the direction of travel 12, than the corresponding holder 10 on the right trailing arm 13. In particular in the embodiment example shown in FIG. 3, the holder 10 of the left trailing arm 3 is arranged behind the wheel axle 18 of the connected wheel 16, whereas the articulated holder 10 on the right trailing arm 13 is arranged merely as an example in front of the wheel axle 18 of the right wheel 16. Preferably in this embodiment example it can be provided that the articulated holders 10 on both the left trailing arm 3 and the right trailing arm 13 are arranged behind the wheel axle 18 of the connected wheel 16, wherein the articulated holder 10 of the left trailing arm 3 is arranged slightly further back on the trailing arm 3, in relation to the direction of travel 12, than the corresponding holder 10 on the right trailing arm 13.

Figure 5:
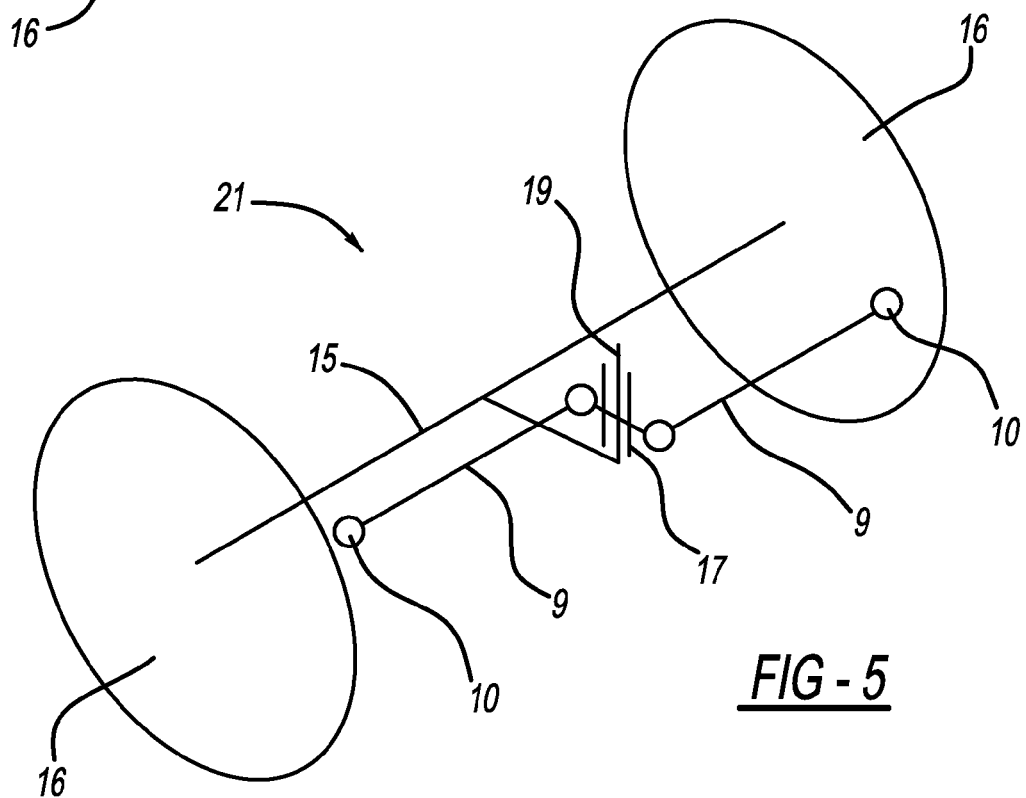

FIG. 5 depicts the third embodiment example, shown in FIG. 3 and described in detail in this context, of the wheel suspension system 21 according to the invention also in a schematic perspective view restricted to the essential components, wherein both articulated holders 10 are arranged behind the wheel axle 18.

The wheel suspension system according to the invention described above is not restricted to the embodiments disclosed here but also comprises any further embodiments acting in the same manner. Evidently also an arrangement of the Watt linkage 8 is conceivable and included by the present invention which is the mirror image of the arrangements shown in the second and third embodiment examples.

In a preferred design the wheel suspension system according to the invention is used in a motor vehicle for the non-steered wheels and comprises a twist beam axle with two wheel-supporting trailing arms pivotably mounted on a motor vehicle body and a cross member connecting the trailing arms together, and a Watt linkage also connecting the trailing arms together, wherein at least one articulated holder, in particular a holder formed by a ball joint or a pivot bush, is integrated in each trailing arm itself for articulated coupling of the Watt linkage.

LIST OF REFERENCE NUMERALS

1 Wheel suspension system
2 Twist beam axle
3 Left trailing arm
4 Left pivot bearing
5 Left wheel mounting
6 Cross member
7 Bracing element
8 Watt linkage
9 Rod of 8
10 Articulated holder
11 Wheel suspension system
12 Direction of travel
13 Right trailing arm
14 Right pivot bearing
15 Motor vehicle body
16 Wheels
17 Rocker of 8
18 Wheel axles
19 Rotary axis of 17
20 Road surface plane
21 Wheel suspension system

The invention claimed is:

1. A wheel suspension system for the non-steered wheels of a motor vehicle, with a twist beam axle which comprises two wheel-supporting trailing arms pivotably mounted on a motor vehicle body (15) and a cross member connecting the trailing arms together, and
   a Watt linkage also connecting the trailing arms together, wherein at least one ball joint is integrated in each trailing arm itself for articulated coupling of the Watt linkage, and wherein the trailing arms include a left trailing arm and a right trailing arm, and wherein the ball joint integrated in the left trailing arm is positioned farther back in a direction toward a rear of the vehicle than the ball joint integrated in the right trailing arm.

2. The wheel suspension system as claimed in claim 1, wherein the Watt linkage comprises two rods and a rocker rotatably mounted on the motor vehicle body, the rods being coupled by their trailing arm side ends in each case at the corresponding ball joints of the trailing arms and being connected together via the rocker with their ends remote from the trailing arms.

3. The wheel suspension system as claimed in claim 2, wherein the rotary axis of the rocker runs parallel to the vehicle longitudinal axis.

4. The wheel suspension system as claimed in claim 2, wherein the rotary axis of the rocker runs parallel to the vehicle vertical axis.

5. The suspension system of claim 1 wherein the trailing arms include a left trailing arm (3) and a right trailing arm (13), and wherein the holder integrated in the left trailing arm (3) is positioned farther back in a direction toward a rear of the vehicle than the holder integrated in the right trailing arm (13).

6. The suspension system of claim 1 wherein the ball joint on the left trailing arm is positioned so as to reside relatively farther back in a direction toward a rear of the vehicle than a wheel axle of a wheel connected to the left trailing arm when a wheel is connected to the left trailing arm, and wherein the ball joint on the right trailing arm is positioned so as to reside relatively farther back in a direction toward a rear of the vehicle than a respective wheel axle of a wheel connected to the right trailing arm when a wheel is connected to the right trailing arm.

7. The suspension system of claim 1 further comprising a bracing element connecting each trailing arm to the cross member.

8. The suspension of claim 7 wherein a wheel mounting is attached to each trailing arm and wherein each bracing element extends along a portion of the trailing arm positioned opposite the wheel mounting.

9. The suspension of claim 7 wherein each bracing element is structured for direct attachment to an associated damping element.

10. A wheel suspension system for the non-steered wheels of a motor vehicle, with a twist beam axle comprising:
- a left trailing arm and a right trailing arm, pivotably mounted on a motor vehicle body;
- a cross member connecting the trailing arms together;
- a Watt linkage also connecting the trailing arms together; and
- an articulated holder integrated in each trailing arm for articulated coupling of the Watt linkage,
- wherein the holder integrated in the left trailing arm is positioned farther back in a direction toward a rear of the vehicle than the holder integrated in the right trailing arm.

11. The wheel suspension system as claimed in claim 10, wherein the articulated holder is formed by a ball joint or by a pivot bush.

12. The wheel suspension system as claimed in claim 10, wherein the Watt linkage comprises two rods and a rocker rotatably mounted on the motor vehicle body, the rods being coupled by their trailing arm side ends in each case at the corresponding holders of the trailing arms and being connected together via the rocker with their ends remote from the trailing arms.

13. The wheel suspension system as claimed in claim 12, wherein the rotary axis of the rocker runs parallel to the vehicle longitudinal axis.

14. The wheel suspension system as claimed in claim 12, wherein the rotary axis of the rocker runs parallel to the vehicle vertical axis.

15. The suspension system of claim 10 wherein the holder on the right trailing arm is positioned so as to reside relatively farther forward in a direction toward a front of the vehicle than a wheel axle of a wheel connected to the right trailing arm when a wheel is connected to the right trailing arm, and wherein the holder on the left trailing arm is positioned so as to reside relatively farther back in a direction toward a rear of the vehicle than a wheel axle of a wheel connected to the left trailing arm when a wheel is connected to the left trailing arm.

16. The suspension system of claim 10 wherein the holder on the left trailing arm is positioned so as to reside relatively farther back in a direction toward a rear of the vehicle than a wheel axle of a wheel connected to the left trailing arm when a wheel is connected to the left trailing arm, and wherein the holder on the right trailing arm is positioned so as to reside relatively farther back in a direction toward a rear of the vehicle than a respective wheel axle of a wheel connected to the right trailing arm when a wheel is connected to the right trailing arm.

* * * * *